United States Patent
Yoakum

(10) Patent No.: US 9,736,312 B2
(45) Date of Patent: Aug. 15, 2017

(54) METHOD AND SYSTEM FOR CONTROLLING AUDIO SIGNALS IN MULTIPLE CONCURRENT CONFERENCE CALLS

(75) Inventor: John H. Yoakum, Cary, NC (US)

(73) Assignee: Avaya Inc., Basking Ridge, NJ (US)

( * ) Notice: Subject to any disclaimer, the term of this patent is extended or adjusted under 35 U.S.C. 154(b) by 1589 days.

(21) Appl. No.: 12/948,140

(22) Filed: Nov. 17, 2010

(65) Prior Publication Data

US 2012/0121076 A1 May 17, 2012

(51) Int. Cl.
*H04M 3/42* (2006.01)
*H04M 3/56* (2006.01)
(Continued)

(52) U.S. Cl.
CPC ........ *H04M 3/568* (2013.01); *H04L 12/1822* (2013.01); *H04M 3/564* (2013.01); *H04M 2250/62* (2013.01)

(58) Field of Classification Search
USPC ............ 379/202.01, 203.01, 204.01, 205.01, 379/206.01; 370/260, 261, 262, 352, 353,
(Continued)

(56) References Cited

U.S. PATENT DOCUMENTS

| | | |
|---|---|---|
| 4,650,929 A | 3/1987 | Boerger et al. |
| 4,734,934 A | 3/1988 | Boggs et al. |

(Continued)

FOREIGN PATENT DOCUMENTS

| | | |
|---|---|---|
| CN | 1703065 A | 11/2005 |
| EP | 0762717 A2 | 3/1997 |

(Continued)

OTHER PUBLICATIONS

Benford, S., et al., "Managing Mutual Awareness in Collaborative Virtual Environments," Proceedings VRST '94, Aug. 1994, ACM Press, Singapore, 14 pages.

(Continued)

*Primary Examiner* — Ahmad F Matar
*Assistant Examiner* — Kharye Pope
(74) *Attorney, Agent, or Firm* — Sheridan Ross P.C.

(57) ABSTRACT

A method and apparatus for controlling audio signals associated with a plurality of conferences. A user interface is displayed that depicts a first defined area and a second defined area. The first defined area is associated with a first conference and the second defined area is associated with a second conference. A first plurality of participant identifiers is displayed in association with the first defined area, and each of the plurality of participant identifiers corresponds to a different participant of a plurality of participants in the first conference. Aural position identifiers are determined for each participant associated with the first conference, and an aural position identifier is selected for the second conference. Audio signals are provided at aural positions identified by the aural position identifiers, enabling the user to correlate the voices of different participants with corresponding locations on the user interface, and to listen to multiple conferences simultaneously.

19 Claims, 9 Drawing Sheets

(51) Int. Cl.
*H04L 12/18* (2006.01)
*H04L 12/16* (2006.01)
*H04Q 11/00* (2006.01)

(58) Field of Classification Search
USPC ......... 370/354, 355; 455/416; 709/204, 205, 709/206, 207
See application file for complete search history.

(56) References Cited

U.S. PATENT DOCUMENTS

| | | |
|---|---|---|
| 5,020,098 A | 5/1991 | Celli |
| 5,113,431 A | 5/1992 | Horn |
| 5,533,112 A | 7/1996 | Danneels |
| 5,539,741 A | 7/1996 | Barraclough et al. |
| 5,790,635 A | 8/1998 | Dezonno |
| 5,889,843 A | 3/1999 | Singer et al. |
| 6,011,851 A | 1/2000 | Connor et al. |
| 6,125,115 A | 9/2000 | Smits |
| 6,178,237 B1 | 1/2001 | Horn |
| 6,219,045 B1 | 4/2001 | Leahy et al. |
| 6,241,612 B1 | 6/2001 | Heredia |
| 6,327,567 B1 | 12/2001 | Willehadson et al. |
| 6,330,022 B1 | 12/2001 | Seligmann |
| 6,408,327 B1 | 6/2002 | McClennon et al. |
| 6,501,739 B1 | 12/2002 | Cohen |
| 6,539,087 B1 | 3/2003 | Walsh et al. |
| 6,559,863 B1 | 5/2003 | Megiddo |
| 6,657,975 B1 | 12/2003 | Baxley et al. |
| 6,675,054 B1 | 1/2004 | Ruberg |
| 6,807,563 B1 | 10/2004 | Christofferson et al. |
| 6,813,360 B2 | 11/2004 | Gentle |
| 6,839,417 B2 | 1/2005 | Weisman et al. |
| 6,850,496 B1 | 2/2005 | Knappe et al. |
| 6,879,565 B2 | 4/2005 | Baxley et al. |
| 6,959,075 B2 | 10/2005 | Cutaia et al. |
| 6,985,571 B2 | 1/2006 | O'Malley et al. |
| 7,006,616 B1 | 2/2006 | Christofferson et al. |
| 7,111,049 B1 | 9/2006 | Granger et al. |
| 7,180,997 B2 | 2/2007 | Knappe |
| 7,181,690 B1 | 2/2007 | Leahy et al. |
| 7,194,084 B2 | 3/2007 | Shaffer et al. |
| 7,412,392 B1* | 8/2008 | Satapathy ................ 704/270.1 |
| 7,418,090 B2 | 8/2008 | Reding et al. |
| 7,456,858 B2 | 11/2008 | Schrader et al. |
| 7,466,334 B1 | 12/2008 | Baba |
| 7,908,320 B2 | 3/2011 | Ludwig et al. |
| 7,933,226 B2* | 4/2011 | Woodruff et al. ............ 370/260 |
| 7,995,732 B2* | 8/2011 | Koch et al. ............... 379/204.01 |
| 8,005,023 B2 | 8/2011 | Li et al. |
| 8,059,599 B1 | 11/2011 | Rogers et al. |
| 8,315,366 B2 | 11/2012 | Basart et al. |
| 8,351,589 B2 | 1/2013 | Acero et al. |
| 2002/0013813 A1 | 1/2002 | Matsuoka |
| 2002/0020951 A1 | 2/2002 | Choi |
| 2002/0181721 A1 | 12/2002 | Sugiyama et al. |
| 2003/0021400 A1 | 1/2003 | Grandgent et al. |
| 2003/0112947 A1 | 6/2003 | Cohen |
| 2003/0117531 A1 | 6/2003 | Rovner et al. |
| 2003/0174657 A1 | 9/2003 | Qin |
| 2003/0234859 A1 | 12/2003 | Malzbender et al. |
| 2004/0013252 A1 | 1/2004 | Craner |
| 2004/0047461 A1 | 3/2004 | Weisman et al. |
| 2004/0052218 A1 | 3/2004 | Knappe |
| 2004/0101120 A1 | 5/2004 | O'Malley et al. |
| 2004/0190700 A1 | 9/2004 | Cutaia et al. |
| 2004/0240652 A1 | 12/2004 | Kanada |
| 2005/0053214 A1 | 3/2005 | Reding et al. |
| 2005/0062843 A1 | 3/2005 | Bowers et al. |
| 2005/0181872 A1 | 8/2005 | Acharya et al. |
| 2005/0271194 A1 | 12/2005 | Woods et al. |
| 2005/0280701 A1 | 12/2005 | Wardell |
| 2006/0067500 A1* | 3/2006 | Christofferson et al. ........ 379/202.01 |
| 2006/0104458 A1 | 5/2006 | Kenoyer et al. |
| 2007/0071204 A1 | 3/2007 | Kanada |
| 2007/0133436 A1 | 6/2007 | Provino et al. |
| 2007/0279484 A1 | 12/2007 | Derocher et al. |
| 2008/0037749 A1* | 2/2008 | Metzger et al. ......... 379/202.01 |
| 2008/0144794 A1 | 6/2008 | Gardner |
| 2008/0144876 A1 | 6/2008 | Reining et al. |
| 2008/0260131 A1 | 10/2008 | Akesson |
| 2009/0086949 A1* | 4/2009 | Caspi et al. ............. 379/202.01 |
| 2009/0220064 A1* | 9/2009 | Gorti et al. ............. 379/202.01 |
| 2010/0020951 A1 | 1/2010 | Basart et al. |
| 2010/0073454 A1 | 3/2010 | Lovhaugen et al. |
| 2010/0158203 A1 | 6/2010 | Mikan et al. |
| 2011/0077755 A1 | 3/2011 | Yoakum et al. |

FOREIGN PATENT DOCUMENTS

| | | |
|---|---|---|
| EP | 1954019 A1 | 8/2008 |
| GB | 2303516 A | 2/1997 |
| WO | 9941880 A1 | 8/1999 |
| WO | 0048379 A1 | 8/2000 |
| WO | 2004095822 A1 | 11/2004 |
| WO | 2010046736 A1 | 4/2010 |
| WO | 2011036543 A1 | 3/2011 |

OTHER PUBLICATIONS

Damer, B., "Avatars!: Exploring and Building Virtual Worlds on the Internet (excerpts)", Peachpit Press, Berkeley, 1998, 158 pages.
No Author, "Digital Space Traveler User Guide," The Digital Space Commons, Chapters 1-8, http://www.digitalspace.com/traveler/DigitalSpaceTravelerUserGuide.pdf, 46 pages.
McCarthy, S., "PC users step through their screens via OnLive!," Telephony Online, Sep. 9, 1996, accessed May 27, 2007, http://telephonyonline.com/mag/telecom_pc_users_step/, 2 pages.
No Author, "OnLive! Products," OnLive! Technologies, Inc., accessed May 22, 2007, http://web.archive.org/web/19970714193742/http://www.onlive.com/prod/, 3 pages.
Liesenborgs, J., "Voice over IP in networked virtual environments," Maastricht University Doctoral Thesis, 1999-2000 Academic Year, Title Page, Table of Contents and Chapters 6 and 10, 18 pages.
Eubank, W., "Summer Internet World '97, McCormick Place, Chicago, Illinois, Jul. 21-25, 1997", Aug. 1, 1996, updated Aug. 1, 1997, http://www.eubank-web.com/William/Articles/world97.htm, 5 pages.
No Author, "3D Conferencing White Paper," DiamondWare, May 19, 2005, 7 pages.
No Author, "3D Audio through the Internet," DiamondWare, May 15, 2005, 7 pages.
No Author, "Out With the Old, in With Palantir," DiamondWare, Sep. 28, 2003, 2 pages.
International Search Report for PCT/IB2010/002384 mailed Feb. 2, 2011, 10 pages.
Search Report for United Kingdom Patent Application No. 1119805.8 issued Mar. 14, 2012, 2 pages.
Notice of Allowance for U.S. Appl. No. 12/564,262 mailed Nov. 25, 2011, 10 pages.
Non-final Office Action for U.S. Appl. No. 12/564,262 mailed Aug. 16, 2011, 7 pages.
Non-final Office Action for U.S. Appl. No. 11/233,773 mailed Oct. 25, 2011, 37 pages.
Advisory Action for U.S. Appl. No. 11/233,773 mailed Aug. 9, 2011, 3 pages.
Final Office Action for U.S. Appl. No. 11/233,773 mailed Jun. 6, 2011, 42 pages.
Non-final Office Action for U.S. Appl. No. 11/233,773 mailed Dec. 28, 2010, 38 pages.
Advisory Action for U.S. Appl. No. 11/233,773 mailed Nov. 9, 2010, 3 pages.
Final Office Action for U.S. Appl. No. 11/233,773 mailed Jun. 22, 2010, 37 pages.
Non-final Office Action for U.S. Appl. No. 11/233,773 mailed Oct. 28, 2009, 38 pages.
Final Office Action for U.S. Appl. No. 11/233,773 mailed May 11, 2009, 34 pages.

(56) References Cited

OTHER PUBLICATIONS

Non-final Office Action for U.S. Appl. No. 11/233,773 mailed Sep. 16, 2008, 31 pages.
Final Office Action for U.S. Appl. No. 11/983,616 mailed Apr. 11, 2012, 17 pages.
Non-final Office Action for U.S. Appl. No. 11/983,616 mailed Sep. 28, 2011, 14 pages.
Non-final Office Action for U.S. Appl. No. 12/569,931 mailed Aug. 3, 2012, 16 pages.
Notice of Allowance for U.S. Appl. No. 12/555,413 mailed Aug. 17, 2012, 9 pages.
Non-final Office Action for U.S. Appl. No. 12/887,734 mailed Sep. 4, 2012, 15 pages.
Final Office Action for U.S. Appl. No. 11/233,773 mailed Jun. 27, 2012, 49 pages.
Final Office Action for U.S. Appl. No. 12/569,931 mailed Dec. 19, 2012, 16 pages.
Final Office Action for U.S. Appl. No. 12/887,734 mailed Jan. 3, 2013, 16 pages.
Notice of Allowance for U.S. Appl. No. 12/569,931 mailed May 28, 2013, 7 pages.
Office Action for Chinese Patent Application No. 201080030095.1, mailed Dec. 23, 2013, 15 pages (English Translation).
Second Office Action for Chinese Patent Application No. 201080030095.1, mailed Sep. 10, 2014, 9 pages.
Office Action for Chinese Patent Application No. 201080030095.1, mailed Dec. 23, 2013, 11 pages.
Notice of Allowance for U.S. Appl. No. 12/887,734, mailed Jan. 16, 2014, 17 pages.
Non-Final Office Action for U.S. Appl. No. 11/983,616, mailed Feb. 5, 2014, 19 pages.

* cited by examiner

METHOD AND SYSTEM FOR CONTROLLING AUDIO SIGNALS IN MULTIPLE CONCURRENT CONFERENCE CALLS

FIELD OF THE DISCLOSURE

The present disclosure relates generally to conference calls, and in particular to controlling the audio signals of participants in multiple concurrent conference calls.

BACKGROUND

Conference calls reduce the need to travel, and consequently save money and time. In the past, people participated in conference calls via a telephone, but today many different types of processing devices, including desktop and laptop computers, tablet processing devices, slate processing devices, and smartphones can send and receive audio signals, and thus may be used for conferencing. Because such processing devices may have a display, user interfaces have been developed which simplify setting up and/or participating in a conference call. Users of such processing devices typically wear headsets, headphones, or earbuds in conjunction with a microphone to send and receive voice signals.

It is not uncommon to receive invitations to participate in multiple conference calls that are scheduled at times that overlap one another. Typically the invitee must turn down one of the invitations, even though the invitee may want to participate in the call, and may know that the call will nevertheless take place at the requested time irrespective of whether the invitee accepts or rejects the invitation. A participant in a conference call may spend 95% of the time listening, and 5% or less of the time speaking. However, not knowing exactly when the invitee may be expected to speak, or may desire to speak, requires that the invitee listen to the entire call, diminishing his ability to participate in multiple conferences simultaneously.

Communications that occur via electronic devices are typically monaural; therefore, the voices of the participants in a conference generally sound as if they are emanating from the same location. In a conference call with a small number of participants where each participant may know the others, and may recognize the others' voices, monaural audio streams may be satisfactory. But as participants in a conference call begin to talk simultaneously, as frequently happens as a discussion gains momentum, communications quickly become indecipherable as listeners cannot discern who is saying what. Many conferencing systems attempt to improve this situation by providing participants with only the voice signals of the most active speaker, and those of the loudest participant attempting to interrupt the active speaker. This approach, however, effectively limits the conference to one or two speakers and tends to prioritize loud and persistent speakers.

For practical purposes, it would be extremely difficult, if not impossible, to listen to concurrent conference calls using the same communications device, because the audio signals generated in each conference would sound as if they were emanating from the same position. Consequently, it would be difficult or impossible for the participant to intuitively distinguish which audio signals were associated with which conference.

Studies have established that the human brain can process multiple concurrent audio signals in a stereo audio environment much easier than in a monaural audio environment. Since many communication devices today, including many smartphones, are capable of providing a stereo signal to an output port, it would be beneficial if the audio signals associated with multiple simultaneous conference calls could be generated in stereo, and placed at different aural positions such that a participant in multiple concurrent conference calls could easily and intuitively distinguish those audio signals emanating from one conference call from the audio signals emanating from another conference call. This would allow a participant to participate in multiple concurrent conference calls, and relatively easily distinguish what is being said in each conference call.

SUMMARY

Embodiments disclosed herein relate to the control of audio signals associated with multiple concurrent conferences. In one embodiment, a user interface is displayed on a display, and the user interface depicts a first defined area which is associated with a first conference and a second defined area that is associated with a second conference. A first plurality of participant identifiers is displayed in association with the first defined area. Each of the first plurality of participant identifiers corresponds to a participant in the first conference. A second plurality of participant identifiers is displayed in association with the second defined area, and each of the second plurality of participant identifiers corresponds to a participant in the second conference. It is determined, via user input for example, that the first conference is a selected conference.

An aural position identifier identifies an aural position, with respect to a reference position, at which an audio signal may be aurally positioned. A plurality of first aural position identifiers is determined. Each first aural position identifier is based on a position of a corresponding participant identifier of the first plurality of participant identifiers and the reference position. A second aural position identifier is determined for the second defined area, and is different from each of the first aural position identifiers.

An audio signal of at least one participant in the first conference is provided to an output port at an aural position based on the first aural position identifier corresponding to the at least one participant. An audio signal from at least one participant in the second conference is concurrently provided to the output port at an aural position based on the second aural position identifier.

The user hears the participant in the first conference at the aural position identified by the corresponding first aural position identifier, and concurrently hears the participant in the second conference at the aural position identified by the second aural position identifier. Because the audio signals from the different conferences are at different aural positions, the user can easily discern from which conference each voice is emanating. Moreover, because the audio signals are aurally positioned via the user interface, the user can visually correlate the audio signals with particular conferences.

The audio signal generated by the user may be provided to the selected conference and not the non-selected conference. Thus, if the first conference is the selected conference, and the user begins to speak, the audio signal associated with the user's voice is provided to the participants in the first conference and not to those in the second conference. The user may easily select the second conference to be the selected conference, and thereafter the audio signals generated by the user will be provided to the second conference and not the first conference.

In one embodiment, the second defined area may overlap the first defined area, and the overlap area may include the second plurality of participant identifiers. Each participant corresponding to one of the second plurality of participant identifiers is a participant in both the first conference and the second conference. In this manner, the user may easily initiate a "side" conference with a subset of participants in a conference, while concurrently listening to those participants in the original conference who are not participating in the side conference.

In one embodiment, a volume of an audio signal may be based on a distance between a position of a defined area with respect to a reference position. For example, a user may drag a defined area associated with a non-selected conference from a first position on the user interface to a second position on the user interface which is farther from the reference position than the first position. In response, based on the increased distance, a volume of the audio signals that are generated in the non-selected conference may be decreased.

Those skilled in the art will appreciate the scope of the present embodiments and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the embodiments.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the embodiments and will recognize applications of these concepts not particularly addressed herein. It should be understood that these concepts and applications fall within the scope of the disclosure and the accompanying claims.

Embodiments disclosed herein relate to controlling audio signals from multiple concurrent (i.e., simultaneous) conferences. While for purposes of illustration, the embodiments will be described herein in the context of business conferences, the embodiments disclosed herein may be utilized in conference calls in any context.

Figure 1:
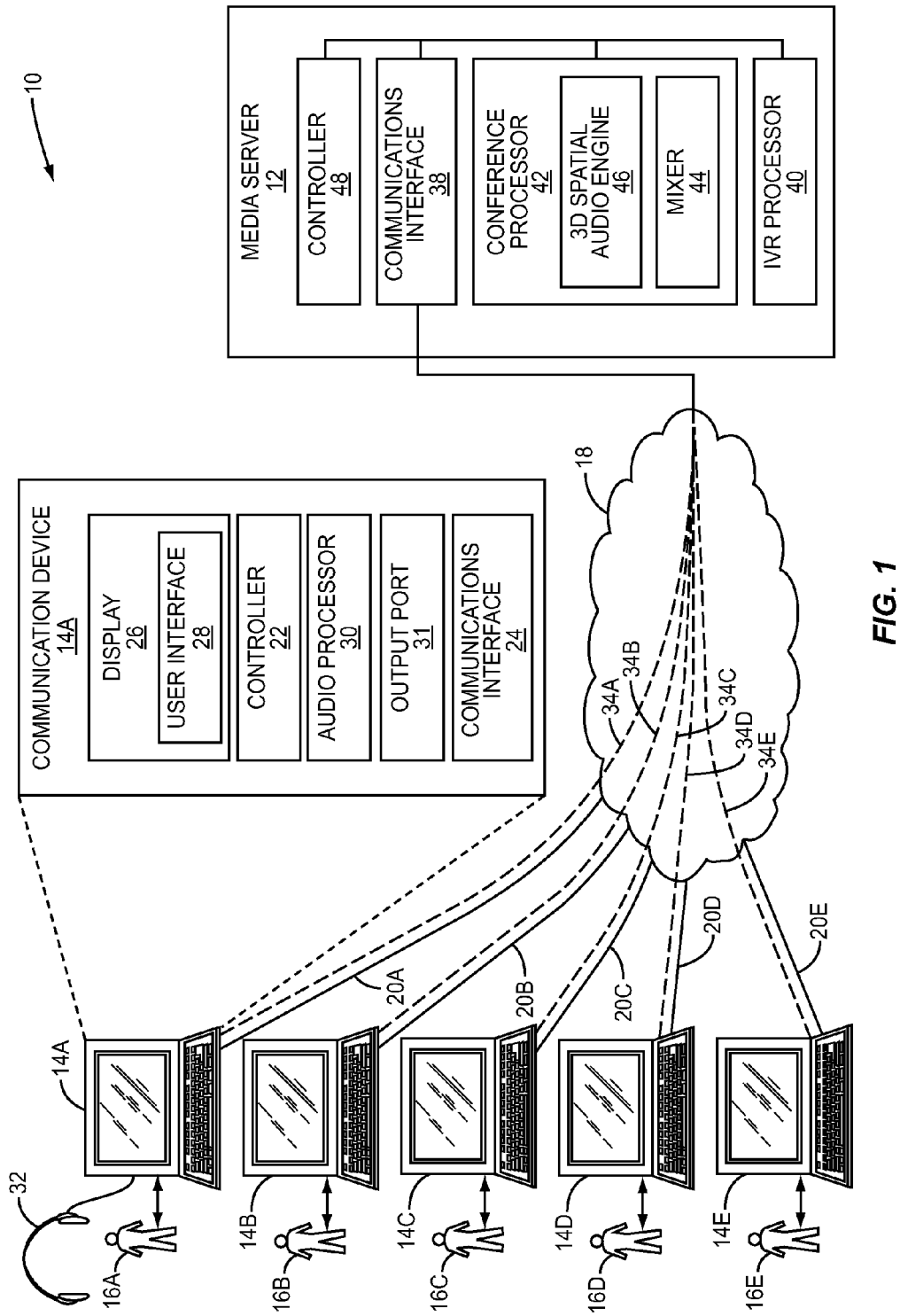
FIG. 1 is a block diagram illustrating a system in which embodiments disclosed herein may be practiced.

FIG. 1 is a block diagram illustrating a system 10 in which embodiments disclosed herein may be practiced. The system 10 includes a plurality of processing devices, including a media server 12 and a plurality of communication devices 14A-14E (generally, communication device 14 or communication devices 14). The communication devices 14 may be any device capable of sending and receiving voice signals, and may comprise, for example, a computer; a personal digital assistant (PDA); a mobile phone, such as an Apple® iPhone®; or the like. The present embodiments typically operate in the context of a conference, wherein at least two users, such as a controlling participant 16A and one or more participants 16B-16E (generally, participant 16 or participants 16), use the communication devices 14A-14E to talk with one another. The phrase "controlling participant" is used herein to distinguish the particular participant that is manipulating a user interface to control how he hears audio signals associated with multiple concurrent conferences, as discussed in greater detail herein, from the other participants in the conference. However, the controlling participant is otherwise no different from any other participant, and each participant may be a "controlling participant" in the sense that each participant may have the ability to manipulate a user interface to control how they hear audio signals associated with multiple concurrent conferences.

The communication devices 14 are communicatively coupled to the media server 12 via a network 18. The communication devices 14A-14E may connect to the network 18 via any suitable network access paths 20A-20E (generally, network access path 20 or network access paths 20), such as, for example, telephony technology, digital subscriber line technology, cable modem technology, cellular technology, Wi-Fi®, Bluetooth®, or the like. Data, such as control signals and audio signals, as described in greater detail herein, are typically carried over a corresponding network access path 20.

An exemplary communication device 14, such as the communication device 14A, includes a controller 22, which may include one or more central processing units and random access memory (RAM) (not shown), for controlling the overall operation of the communication device 14A. Program modules (not shown) stored in the memory may be used to adapt the controller to implement the functionality described herein.

The communication device 14A may also include a communications interface 24 that is adapted to communicate with the network 18 to facilitate communications between the communication device 14A and external devices, such as the media server 12. The communication device 14A also includes, or is coupled to, a display 26 upon which a user interface 28 may be displayed and manipulated by the controlling participant 16A. During a conference, data received from the media server 12 via the communications interface 24 may be used to update the user interface 28. Data generated by the communication device 14A in response to manipulations of the user interface 28 may be provided to the media server 12 via the communications interface 24. The communication device 14A also preferably includes an audio processor 30 which generates an audio signal of the controlling participant 16A, and sends the audio signal to the media server 12. The phrase "audio signal"

refers to the voice signals of a participant 16. The audio signal is typically a digitized data stream that is generated by the audio processor 30 and represents the voice signals of the respective participant 16. Over the course of a conference, the audio signal of any particular participant 16 is generally discontinuous, in that the audio signal is typically generated only when the participant 16 is actually speaking. As used herein, the phrase "incoming audio signal" will refer to an audio signal that is sent from a communication device 14 to the media server 12, and the phrase "outgoing audio signal" will refer to an audio signal that is sent from the media server 12 to a communication device 14.

The audio processor 30 receives outgoing audio signals from the media server 12 and provides the outgoing audio signals to an output port 31 to which a multi-channel capable device, such as a stereo headset 32, may be coupled. Those skilled in the art will recognize that other multi-channel capable devices, such as stereo speakers, may also be used to provide the outgoing audio signals to the controlling participant 16A.

Each of the communication devices 14 establishes a communication session 34, denoted by reference characters 34A-34E, respectively, with the media server 12. A communication session 34 may comprise any type of session or connection between a respective communication device 14 and the media server 12 that enables the transmission of an audio signal from the respective communication device 14 to the media server 12, and the receipt of an audio signal from the media server 12 to the respective communication device 14, irrespective of the underlying physical infrastructure used to carry the audio signal, or the particular protocol used to establish the communication session 34 between the respective communication device 14 and the media server 12. Suitable protocols may include, for example, TCP/IP, Session Initiation Protocol (SIP), conventional PSTN signaling, or the like. The communication sessions 34 are typically physically implemented over a corresponding network access path 20.

The media server 12 includes a communications interface 38 that interfaces with the communication sessions 34. The communications interface 38 can comprise any suitable combination of hardware and/or software necessary to receive incoming audio streams from the communication sessions 34, and send outgoing audio streams over the respective communication sessions 34. For example, the communications interface 38 could comprise line cards if the communication sessions 34 carry analog voice signals, or could comprise Ethernet circuitry if the communication sessions 34 carry packetized voice signals. The media server 12 may also include an interactive voice recognition (IVR) processor 40 for routing a communication session 34 to the appropriate conference.

The media server 12 also includes a conference processor 42 that may establish one or more conferences between the participants 16. The conference processor 42 includes a mixer 44 that enables the conference processor 42 to mix or combine multiple audio signals and provide a mixed outgoing audio signal to one or more communication sessions 34, as directed by the controlling participant 16A. Additional functionality provided by the mixer 44 will be described in greater detail herein. The conference processor 42 includes, or is coupled to, a three-dimensional (3D) spatial audio engine (3DSAE) 46, which receives incoming audio signals and aural position identifiers, modifies the audio signals, and generates outgoing audio signals that include characteristics, such as phase and frequency information, that aurally position the outgoing audio signals at an aural position indicated by the aural position identifier. For example, the 3DSAE 46 may alter the audio signal of one participant 16 to appear to be originating from a position that is in front of and to the left of the controlling participant 16A, and may alter the audio signal of a second participant 16 to appear to be originating from a position that is in front of and to the right of the controlling participant 16A.

While for purposes of illustration the conference processor 42 is illustrated as containing the 3DSAE 46, the functionality of the 3DSAE 46 may be integral with the conference processor 42 as illustrated, or may be separate from the conference processor 42 and coupled to the conference processor 42 via a communications path. Similarly, while the mixer 44 is illustrated separately from the 3DSAE 46, the 3DSAE 46 may also have mixing capabilities in addition to, or in lieu of, mixing capabilities contained in the mixer 44. Thus, the functionality provided by the conference processor 42, the 3DSAE 46, and the mixer 44 may be implemented by the media server 12 in one or more modules, depending on desired design criteria. For purposes of illustration and brevity, functionality provided by any of the conference processor 42, the 3DSAE 46, or the mixer 44 will generally be described as being provided by the conference processor 42 hereinafter. The media server 12 also includes a controller 48 that includes a central processing unit and RAM (not shown). The controller 48 is coupled to each of the communications interface 38, the IVR processor 40, and the conference processor 42, to control operations thereof.

Embodiments disclosed herein enable the controlling participant 16A to aurally position the audio signals generated by the participants 16B-16E at desired aural positions with respect to the controlling participant 16A. Aural positioning is provided by the conference processor 42 via the 3DSAE 46. The 3DSAE 46 can aurally position an incoming audio signal by modifying the incoming audio signal to generate an outgoing audio signal stream that includes characteristics, such as frequency and phase information, that aurally position the outgoing audio signal so that it is perceived by a listener, such as the controlling participant 16A, as originating from a designated position. The incoming audio signals may be monaural or may be multi-channel. The outgoing voice signals are multi-channel audio signals, such as stereo or Dolby Digital 5.1 audio signals, and are provided to the controlling participant 16A via a multi-channel output device, such as the stereo headset 32. A 3DSAE 46 suitable for use in the present embodiments may be obtained from Avaya Inc., 211 Mt. Airy Road, Basking Ridge, N.J. 07920.

Figure 2:
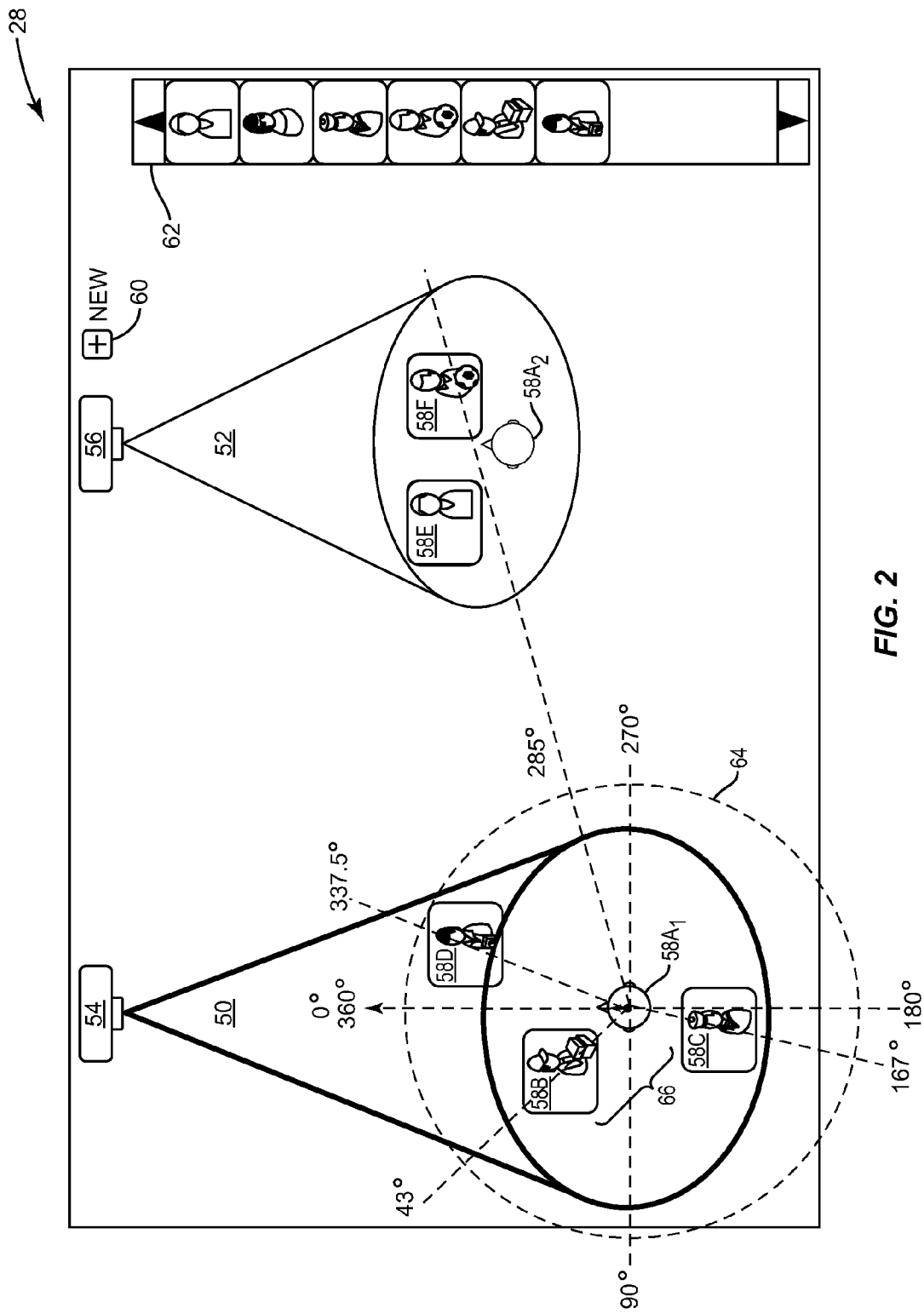
FIG. 2 illustrates an exemplary user interface according to one embodiment.

FIG. 2 illustrates an exemplary user interface 28 according to one embodiment, and will be discussed in conjunction with FIG. 1. The user interface 28 has a first defined area 50 and a second defined area 52. The defined areas 50, 52 are preferably visually distinguishable from one another, and from other portions of the user interface 28. In the embodiment illustrated in FIG. 2, the defined areas 50, 52 comprise images of light beams emanating from projectors 54, 56, respectively, but it will be apparent that any visually distinguishing characteristic may be used to depict defined areas in accordance with the embodiments disclosed herein.

The first defined area 50 is associated with a first conference and the second defined area 52 is associated with a second conference. A first plurality of participant identifiers 58B-58D (generally, participant identifier 58 or participant identifiers 58) are displayed in association with the first defined area 50, and a second plurality of participant identifiers 58E-58F are displayed in association with the second defined area. In one embodiment, the first conference may have been initiated by, for example, the controlling participant 16A clicking on a New Conference button 60, which may cause the first defined area 50 to be depicted. The controlling participant 16A may then "drag and drop" the desired participant identifiers 58B-58D from a contacts list 62 into the first defined area 50. As each participant identifier 58 is dragged from the contacts list 62 and dropped into the first defined area 50, the communication device 14A may send a control signal to the conference processor 42 with the contact information, such as a telephone number or the like, of the participant 16 corresponding to the participant identifier 58, requesting that the conference processor 42 initiate a communication session 34 with the communication device 14 identified by the contact information. In a similar manner, the controlling participant 16A may initiate a second conference with the participants 16E and 16F. Alternately, the first conference may be a conference that was initiated by one of the participants 16B-16D, and the user interface 28, at the initiation of the conference, may depict the first defined area 50 and request that the controlling participant 16A join the first conference.

While the participant identifiers 58 are depicted as iconic images for purposes of illustration, the participant identifiers 58 may be still images or photographs of the corresponding participants 16, or may display actual video of the participants 16 by virtue of video data that is captured by the corresponding communication devices 14 associated with the participants 16 and provided to the communication device 14A of the controlling participant 16A.

In one embodiment, the controlling participant 16A may select one of the conferences to be a selected conference. The selected conference may, for example, be the conference which the controlling participant 16A wishes to speak to at a given point in time. The audio signal of the controlling participant 16A may be provided to those participants 16 participating in the selected conference, but not provided to those in the non-selected conference. The controlling participant 16A may select either the first conference or the second conference to be the selected conference as desired. In one embodiment, the controlling participant 16A may select a conference by selecting the first defined area 50 or the second defined area 52 that is associated with the conference which the controlling participant 16A seeks to make the selected conference.

The selection may be made via an input device such as a mouse or keyboard, or, if the display 26 is a touch display, via touch. As illustrated herein, the defined area associated with the selected conference will be distinguished from the defined area of the non-selected conference via darker, or thicker, lines that define the defined area. Thus, in FIG. 2, the selected conference is the first conference, as illustrated by the first defined area 50 having substantially thicker lines that define the first defined area 50 compared to the lines that define the second defined area 52. It should be apparent that any visually distinguishing characteristic may be used to distinguish between the defined area associated with the selected conference and the defined area associated with a non-selected conference.

The participant identifier $58A_1$ represents a reference position of the controlling participant 16A for aural positioning purposes of the audio signals of the participants 16 in the selected conference. Each participant 16 in the selected conference has a corresponding participant identifier 58 that is depicted in association with the first defined area 50. As illustrated herein, the participants 16 correspond to the participant identifiers 58 that have the same alphabetic reference character. Thus, the controlling participant 16A corresponds to the participant identifier $58A_1$, the participant 16B corresponds to the participant identifier 58B, the participant 16C corresponds to the participant identifier 58C, and the participant 16D corresponds to the participant identifier 58D.

For each of the participant identifiers 58B-58D in the user interface 28, the communication device 14A calculates an aural position identifier corresponding to the position of the respective participant identifiers 58B-58D with respect to the reference position of the participant identifier $58A_1$. As discussed below, the reference position may also include an orientation attribute that identifies a reference direction from which an offset may be calculated or otherwise determined. The aural position identifier may comprise any suitable information that can identify, or otherwise define, the position of a respective participant identifier 58B-58D with respect to the position of the participant identifier $58A_1$. For example, the aural position identifier may comprise an angle of the respective participant identifier 58B-58D with respect to an orientation of the participant identifier $58A_1$, and a distance of the respective participant identifier 58B-58E from the participant identifier $58A_1$.

Aural position identifiers are provided to and used by the 3DSAE 46 to generate an outgoing audio signal associated with a respective participant 16 with the appropriate characteristics, such as frequency and phase information, so that the outgoing audio signal is perceived by the controlling participant 16A as originating from the position indicated by the aural position identifier. The distance information may be used by the 3DSAE 46 to alter the loudness characteristics of the outgoing audio signal.

For example, an aural position identifier may define an aural position via an angle of offset of a participant identifier 58 with respect to a particular orientation of the participant identifier $58A_1$. Assume that the participant identifier $58A_1$ has an orientation toward a 0°/360° location on a 360° circle 64. In other words, the participant identifier $58A_1$ is "looking" toward the 0/360° mark on the 360° circle 64. Thus, the controlling participant's "ears" are oriented toward the 90° mark and the 270° mark, respectively. Note that the 360° circle 64 is provided for purposes of illustration, and would not necessarily be depicted in the user interface 28.

The communication device 14A determines that the position of the participant identifier 58B is at a 43° position (i.e., in front of and to the left of the participant identifier $58A_1$), and is located a distance 66 from the participant identifier $58A_1$. The aural position identifier thus, in this example, may include the angle, 43°, and the distance 66. Note that the distance 66 may be calculated from any desired point on the participant identifier 58B with respect to any desired point on the participant identifier $58A_1$. The communication device 14A sends the media server 12 an aural position control signal that includes the aural position identifier and an identifier identifying the audio signals that are to be aurally positioned, such as a communication session identifier identifying the communication session 34B which corresponds to the participant 16B. The 3DSAE 46 aurally positions the audio signal associated with the participant 16B at the aural position identified by the aural position identifier. The audio signal is presented to an output port of the communication device 14A and heard by the controlling participant 16A via a multi-channel output device, such as a headset 32. The audio signal of the participant 16B is perceived by the controlling participant 16A as emanating from a position that is 43° from the direction the controlling participant 16A is facing, and thus the position of the audio signal visually corresponds with the position of the participant identifier 58B with respect to the orientation of the participant identifier 58A$_1$ in the user interface 28.

Similarly, aural position identifiers may be calculated for the participants 16C and 16D based on the positions of the participant identifiers 58C and 58D, respectively, with respect to the position and orientation of the participant identifier 58A$_1$. The aural position identifiers are provided to the media server 12, and the 3DSAE 46 aurally positions the audio signals of the participants 16C and 16D based on the aural position identifiers. In one embodiment, the distance of a participant identifier 58B-58D from the participant identifier 58A$_1$ may determine a volume of the audio signal of the corresponding participant 16. Thus, for example, in FIG. 2, the volume of the audio signal of the participant 16D may be lower than the volume of the audio signals of the participants 16B and 16C because the participant identifier 58D is farther from the participant identifier 58A$_1$ than either of the participant identifiers 58B or 58C.

Audio signal volume control may also be implemented through one or more other techniques. For example, in response to a selection of a particular participant identifier 58, a volume selection tool may be displayed on the user interface 28. The controlling participant 16A may adjust the volume selection tool, which may then cause the communication device 14A to generate and send a control signal to the media server 12 indicating that the volume of the audio signal of the participant 16 who corresponds to the selected participant identifier 58 should be diminished.

While the controlling participant 16A hears the audio signals of the participants 16B-16D in the first conference, the controlling participant 16A concurrently hears any audio signals generated by the participants 16E or 16F in the second conference. Preferably, the audio signals associated with the second conference are aurally positioned based on a position of the second defined area with respect to a reference position, such as the position of the participant identifier 58A$_1$, or based on the position of the participant identifiers 58E or 58F with respect to a reference position, such as the position of the participant identifier 58A$_1$. Assume, for example, that the audio signals associated with the second conference are based on the position of the second defined area 52 with respect to the position of the participant identifier 58A$_1$. In this example, the communication device 14A determines that the second defined area is at a 285° position with respect to the orientation attribute of the reference position. The communication device 14A provides an aural position identifier to the media server 12 identifying the 285° position, and optionally a distance of the second defined area 52 from the reference position. The 3DSAE 46 may then provide to the communication device 14A audio signals generated in the second conference at the designated aural position, such that the controlling participant 16A perceives the audio signal of either the participant 16E or the participant 16F at a position in front of and to the right of the controlling participant 16A (i.e., 285° from the forward direction).

Figure 3:
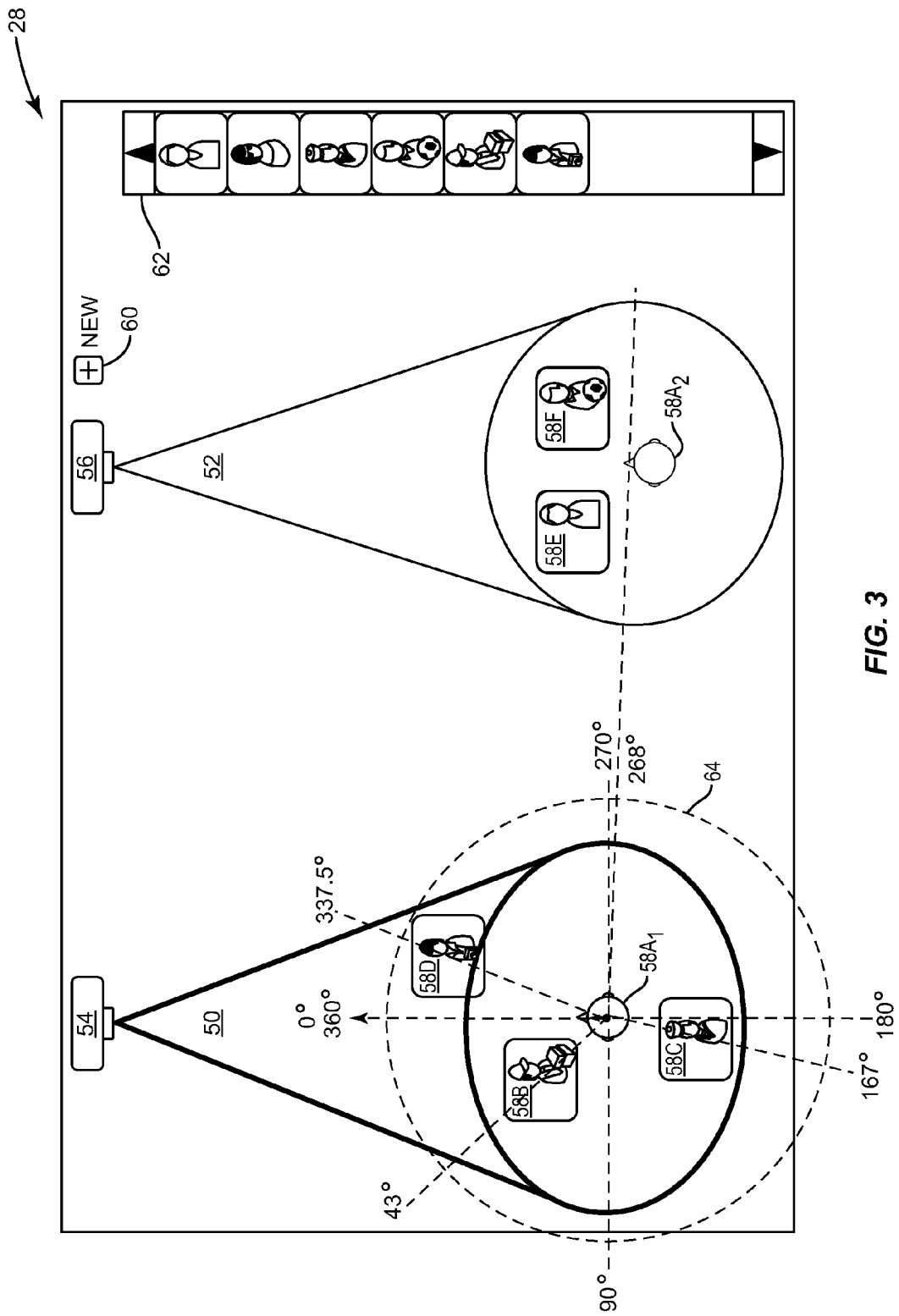
FIG. 3 shows the exemplary user interface illustrated in FIG. 2 after the controlling participant has manipulated the user interface.

FIG. 3 shows the exemplary user interface 28 illustrated in FIG. 2 after the controlling participant 16A has manipulated the user interface 28. In particular, the controlling participant 16A has moved the second defined area 52 from a first location, as illustrated in FIG. 2, to a second location, as illustrated in FIG. 3. In response to the movement of the second defined area 52, the communication device 14A determines or otherwise calculates a new aural position identifier for the second defined area 52 with respect to the reference position. The communication device 14A determines that the second defined area 52 is now at a 268° position with respect to the reference position, and generates an aural position identifier indicating this new position, and provides the aural position identifier to the media server 12. The 3DSAE 46 thereafter provides any audio signals generated in the second conference at the 268° position (i.e., such that the controlling participant 16A perceives the audio signals to be originating from a position to the right and slightly behind the controlling participant 16A), and no longer provides the audio signals generated in the second conference at the 285° position.

Figure 4:
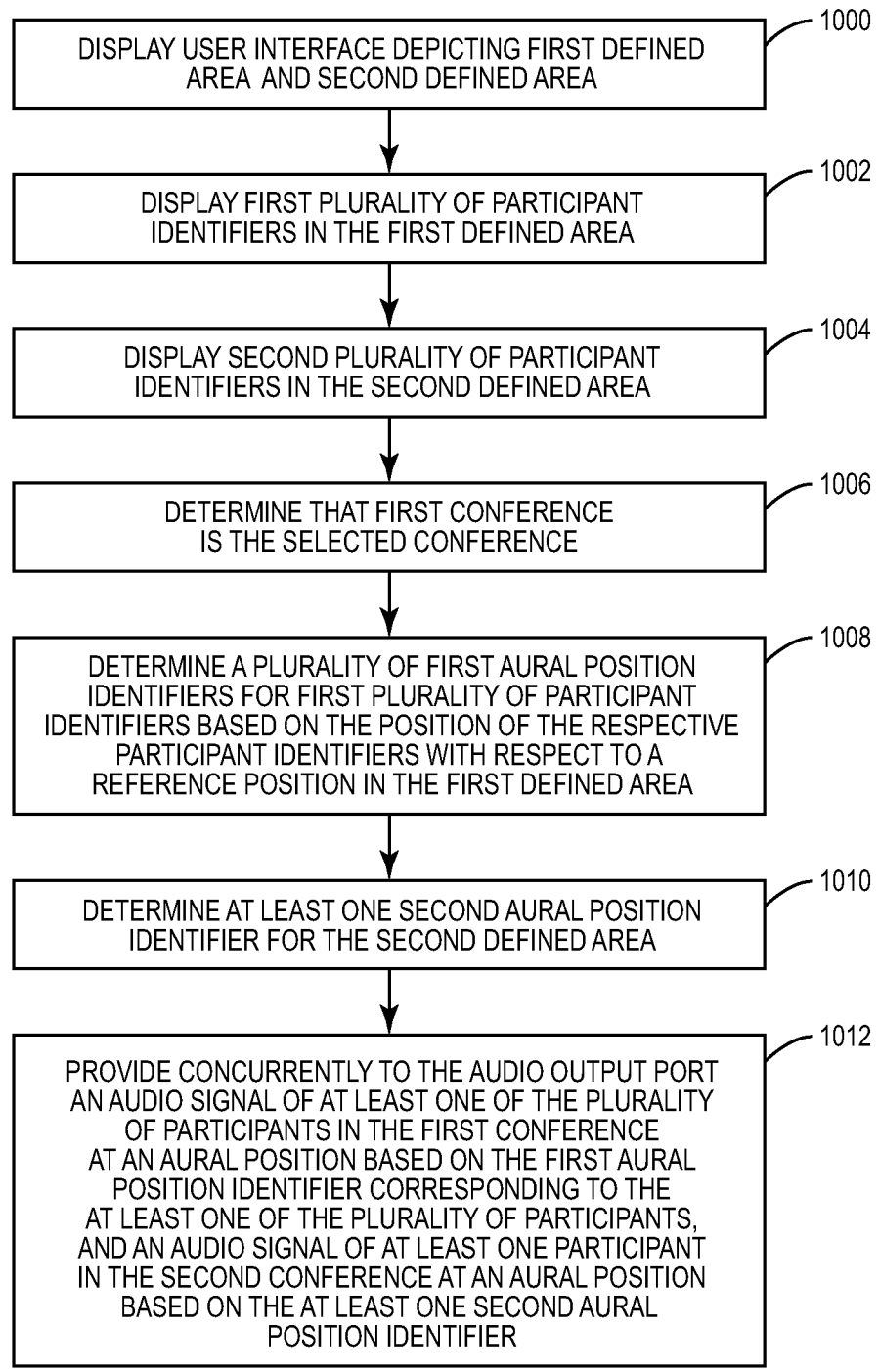
FIG. 4 is a high-level flowchart illustrating a method for controlling audio signals in multiple simultaneous conference calls according to one embodiment.

FIG. 4 is a high-level flowchart illustrating a method for controlling audio signals in multiple simultaneous conference calls according to one embodiment. FIG. 4 will be discussed in conjunction with FIG. 3. The communication device 14A displays the user interface 28, which depicts the first defined area 50 and the second defined area 52 (step 1000). A first plurality of participant identifiers 58B-58D is displayed in the first defined area 50 (step 1002). A second plurality of participant identifiers 58E-58F is displayed in the second defined area 52 (step 1004). It is determined that the first conference is the selected conference (step 1006). As discussed above, the determination may be made, for example, via user input selecting the first defined area 50. First aural position identifiers are determined for each of the first plurality of participant identifiers 58B-58D based on the position of the respective participant identifiers 58 and the reference position indicated by the participant identifier 58A$_1$ in the first defined area 50 (step 1008). At least one second aural position identifier is determined for the second defined area 52 (step 1010). The at least one second aural position identifier may be based on a position of the second defined area 52, or on the position of one or more of the participant identifiers 58E, 58F. The communication device 14A provides concurrently to an audio output port an audio signal of at least one of the participants 16B-16D in the first conference at an aural position based on the first aural position identifier that corresponds to the at least one participant 16, and an audio signal of at least one of the participants 16E-16F is provided at an aural position based on the at least one second aural position identifier (step 1012).

Figure 5:
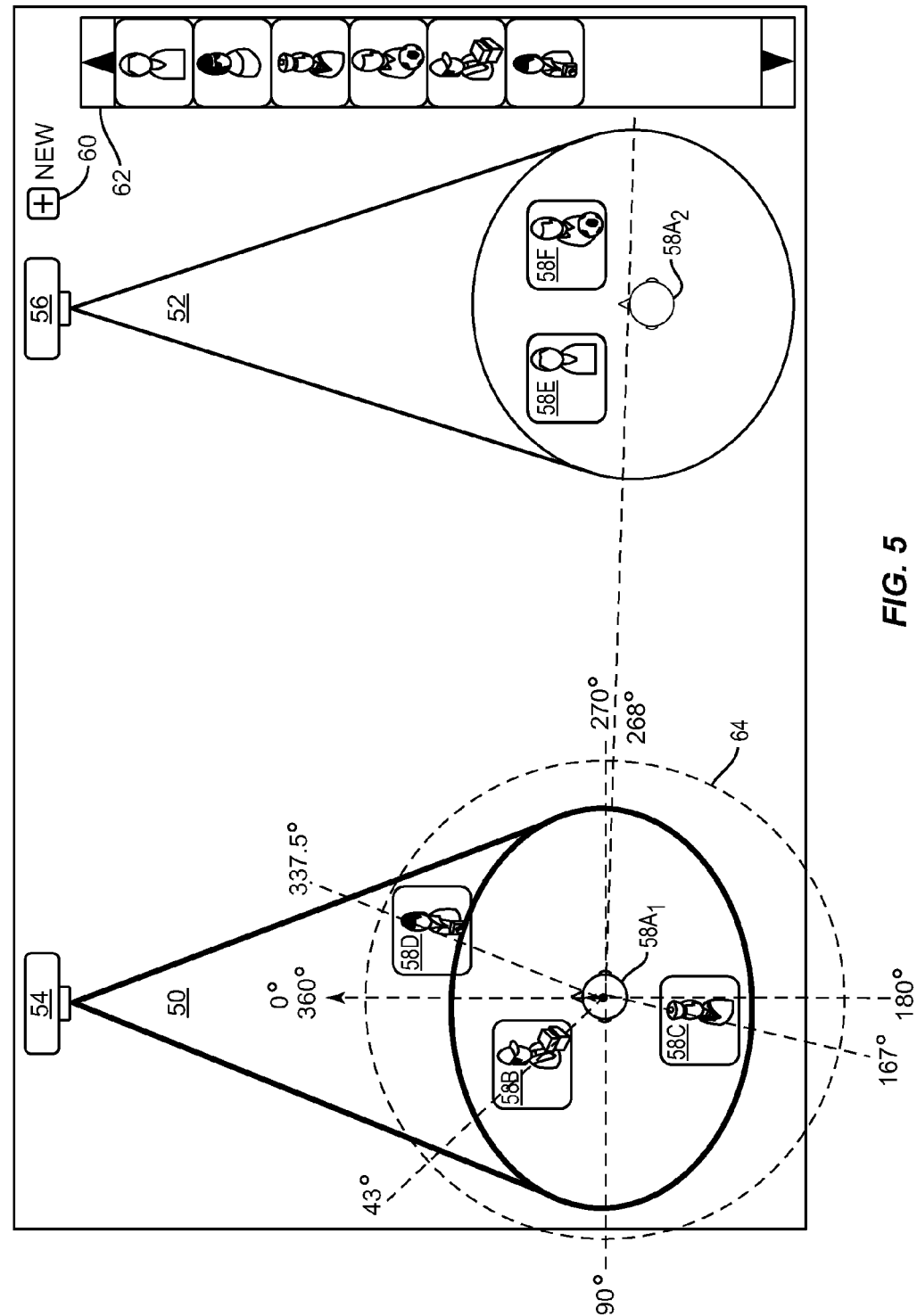
FIG. 5 shows the exemplary user interface illustrated in FIG. 3 after the controlling participant has manipulated the user interface again.

FIG. 5 shows the exemplary user interface 28 illustrated in FIG. 3 after the controlling participant 16A has manipulated the user interface 28. In particular, the controlling participant 16A has moved the second defined area 52 from a first location, as illustrated in FIG. 3, to a second location, as illustrated in FIG. 5, which is farther from the reference position indicated by the participant identifier 58A$_1$. In response to the movement of the defined area, the communication device 14A determines or otherwise calculates a new aural position identifier for the second defined area 52 with respect to the reference position. The communication device 14A determines that the second defined area 52 is at the same orientation (i.e., a 268° position with respect to the reference position) but is farther from the reference position, and generates an aural position identifier identifying this new position, and provides the aural position identifier to the media server 12. The 3DSAE 46 thereafter provides any audio signals generated in the second conference at the 268° position (i.e., such that the controlling participant 16A perceives the audio signals to be originating from a position to the right and slightly behind the controlling participant 16A), but at a decreased volume than prior to the movement of the second defined area 52, based on the greater distance.

Figure 6:
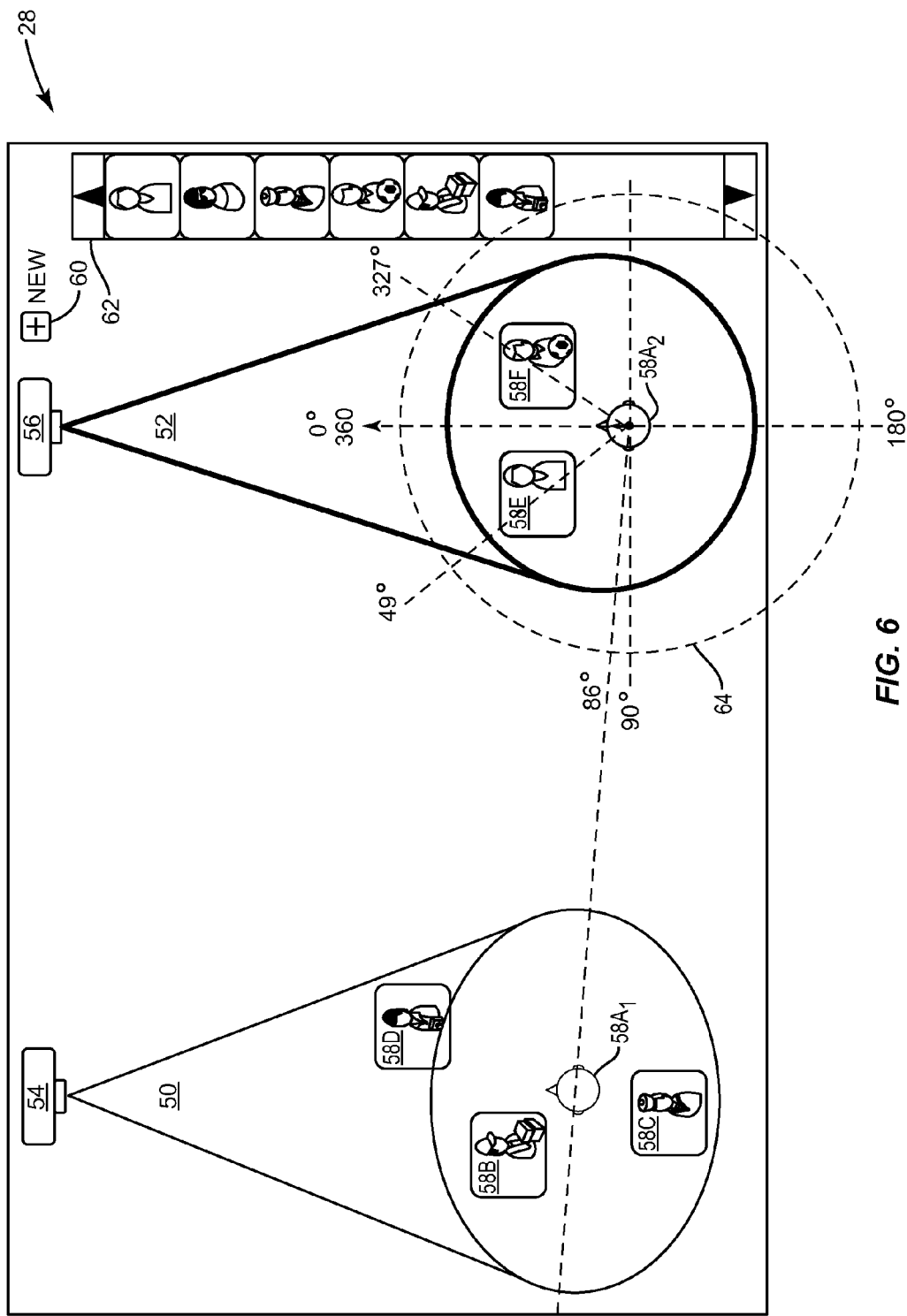
FIG. 6 shows the exemplary user interface illustrated in FIG. 5 after the controlling participant has selected the second conference.

FIG. 6 shows the exemplary user interface 28 illustrated in FIG. 5 after the controlling participant 16A has selected the second conference. In particular, the controlling participant 16A may have, using an input device, clicked or otherwise indicated to the user interface 28 that the controlling participant has selected the second defined area 52. In response, the user interface 28 visually distinguishes the second defined area 52, such as, for example, through the use of darker, or thicker, lines to define the second defined area 52 than those that define the first defined area 50. The communication device 14A determines aural position identifiers for the participants 16E and 16F based on the positions of the corresponding participant identifiers 58E and 58F with respect to the reference position indicated by participant identifier $58A_2$. In particular, the communication device 14A determines that the audio signal of the participant 16E should be positioned at a 49° angle with respect to the reference position, and that the audio signal of the participant 16F should be positioned at a 327° angle with respect to the reference position. The communication device 14A provides the aural position identifiers to the media server 12, along with an indication that the second conference is the selected conference. The 3DSAE 46 will thereafter provide audio signals of the participants 16E and 16F at aural positions such that the controlling participant 16A will perceive the audio signal of the participant 16E as originating in front of and to the left of the controlling participant 16A, and the audio signal of the participant 16F as originating in front of and to the right of the controlling participant 16A. Moreover, because the second conference is the selected conference, the conference processor 42 will provide the audio signal of the controlling participant 16A to the participants 16E and 16F, but not to the participants 16B-16D.

The communication device 14A also determines an aural position identifier for the first defined area 50 based on the position of the first defined area 50, or based on the position of the participant identifiers 58B-58D with respect to the reference position indicated by the participant identifier $58A_2$. Assume that the communication device 14A places all audio signals emanating from the first conference at an aural position based on a position of the first defined area 50. In this example, the communication device 14A determines that the first defined area 50 is at an 86° position with respect to the reference position indicated by the participant identifier $58A_2$. Thus, the controlling participant 16A will perceive any discussions occurring in the first conference as originating directly to the left of the controlling participant 16A.

Figure 7:
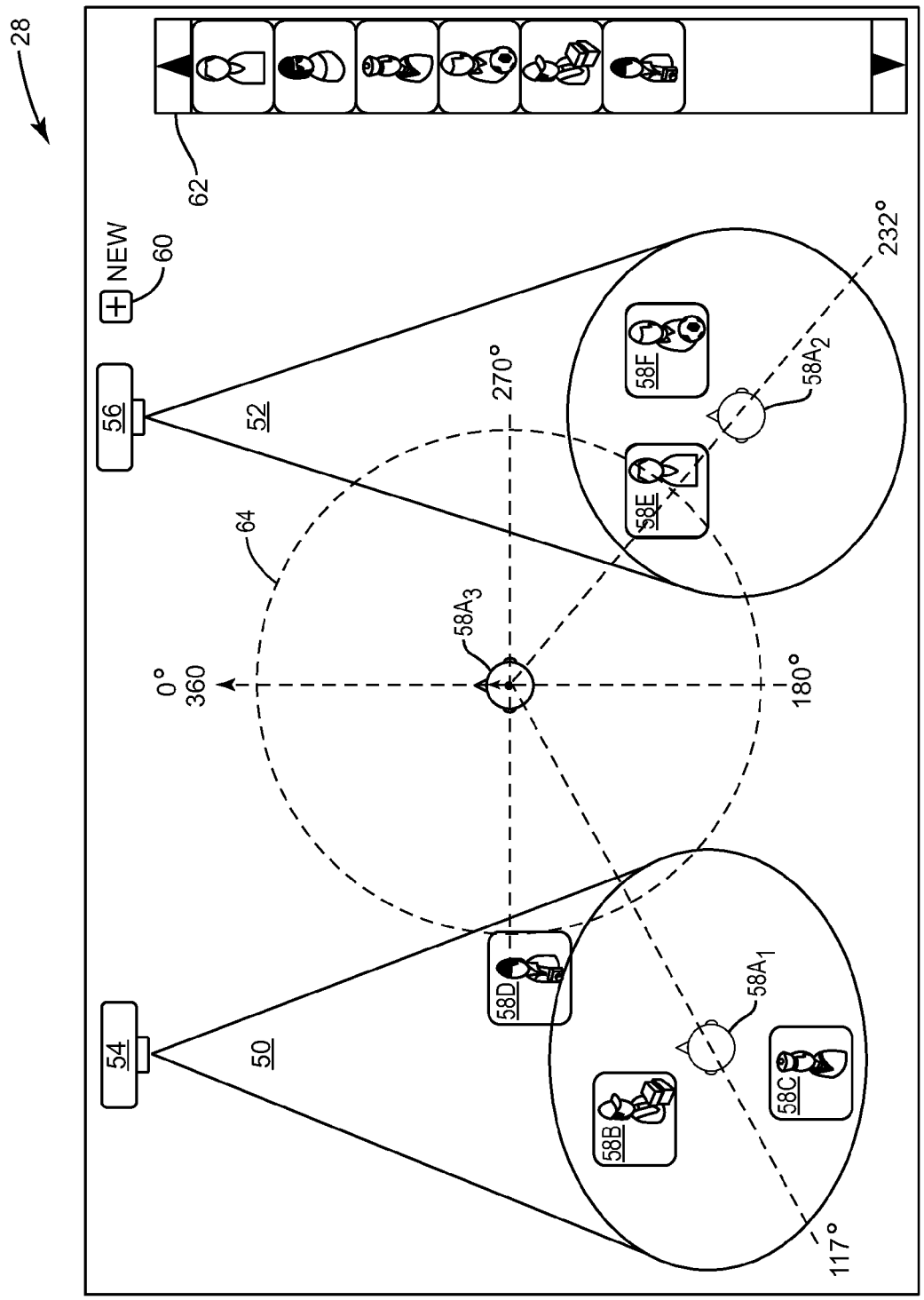
FIG. 7 shows the exemplary user interface illustrated in FIG. 6 after the controlling participant has deselected the second conference.

FIG. 7 shows the exemplary user interface 28 illustrated in FIG. 5 after the controlling participant 16A has deselected the second conference. In this example, neither the first conference nor the second conference is a selected conference. The user interface 28 may depict both the first defined area 50 and the second defined area 52 such that neither has the distinguishing characteristic associated with a selected conference. A participant identifier $58A_3$ may be depicted that is positioned in neither the first defined area 50 nor the second defined area 52. The communication device 14A may determine aural position identifiers for the first conference and the second conference based on the position of the first defined area 50 and the second defined area 52 with respect to the reference position indicated by the participant identifier $58A_3$. The communication device 14A determines that the first defined area 50 is at a 117° position with respect to the reference position and that the second defined area 52 is at a 232° position with respect to the reference position.

The communication device 14A provides the media server 12 with respective aural position identifiers for the first conference and the second conference, and an indication that neither conference is a selected conference. The 3DSAE 46 provides audio signals originating from the first conference at a 117° position, such that the controlling participant 16A perceives such signals as originating behind and to the left of the controlling participant 16A. The 3DSAE 46 provides audio signals originating from the second conference at a 232° position, such that the controlling participant 16A perceives such signals as originating behind and to the right of the controlling participant 16A. The conference processor 42 does not provide the audio signal of the controlling participant 16A to either the first conference or the second conference.

Figure 8A:
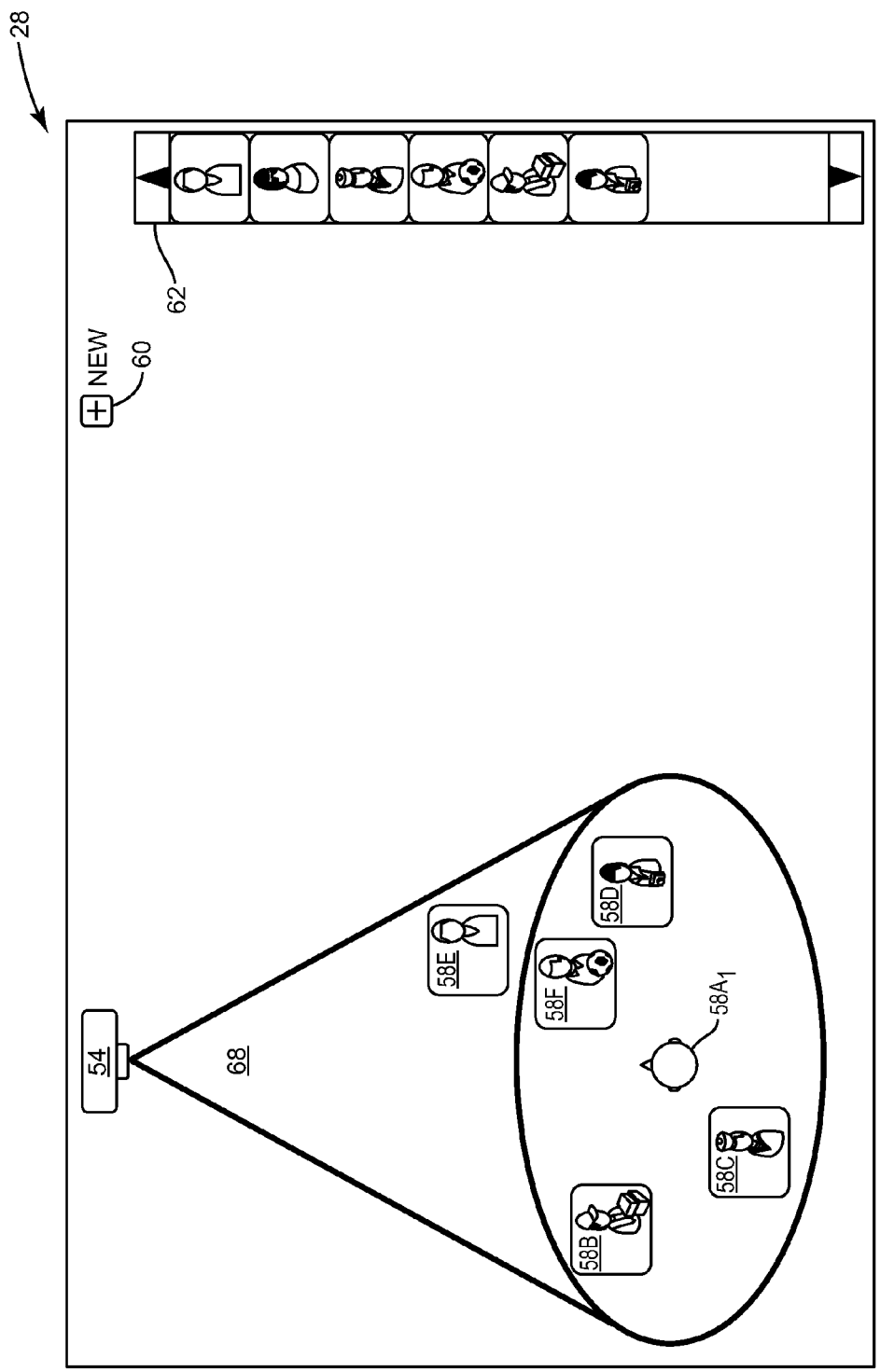
FIGS. 8A and 8B illustrate a method for controlling audio signals in multiple simultaneous conference calls according to another embodiment.
Figure 8B:
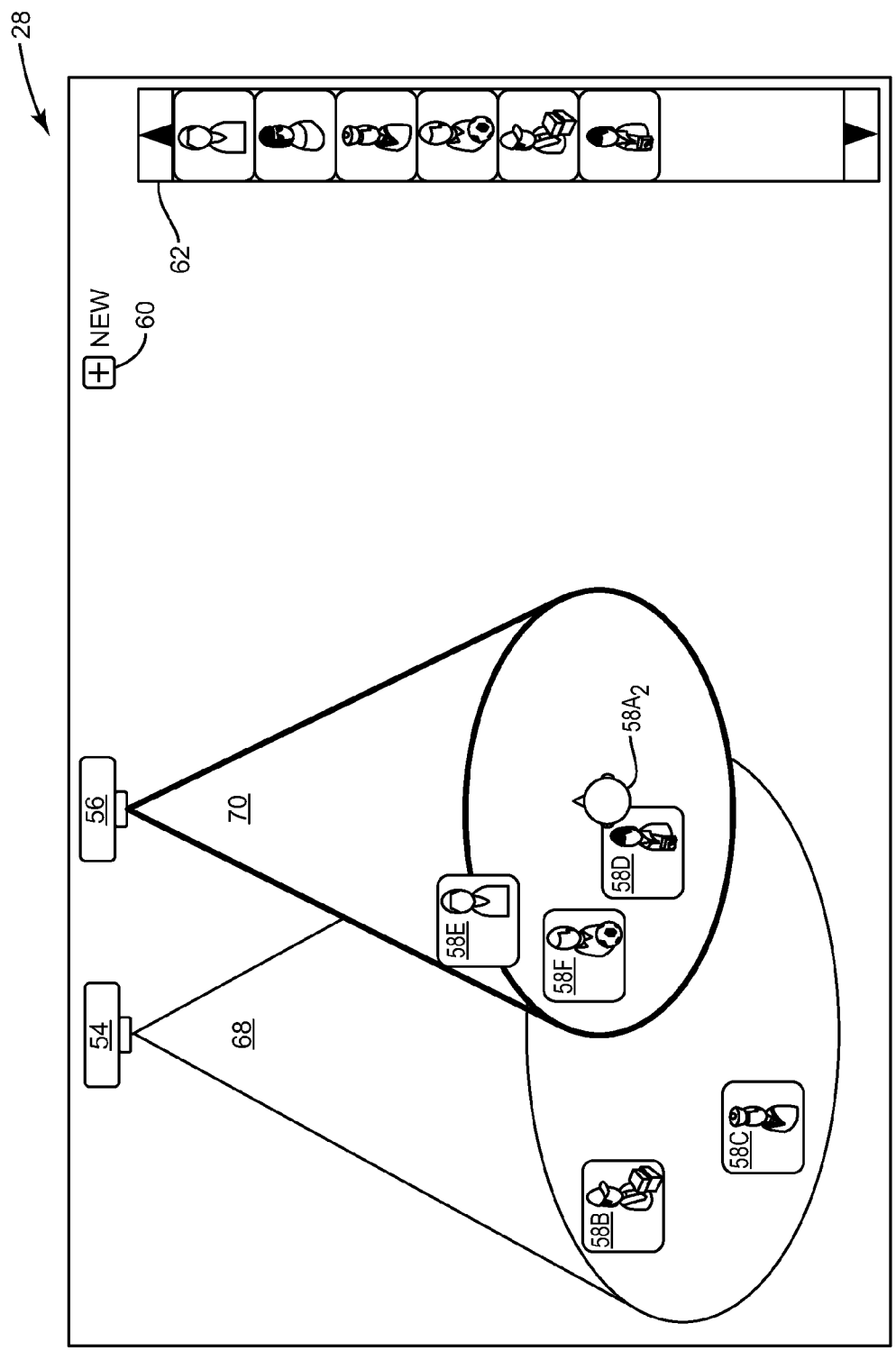

FIGS. 8A and 8B illustrate a method for controlling audio signals in multiple simultaneous conference calls according to another embodiment. FIG. 8A illustrates a user interface 28 having a first defined area 68 corresponding to a first conference having six participants 16A-16F. As discussed with respect to FIGS. 1-7, the communication device 14A may determine aural position identifiers that correspond to each of the participants 16B-16F based on the position of the corresponding participant identifiers 58B-58F with respect to the reference position indicated by the participant identifier $58A_1$. Assume that during the first conference, the controlling participant 16A desires to have a side conference, or second conference, with selected participants 16 in the first conference. In particular, the controlling participant 16A wishes to speak to the participants 16D-16F but not participants 16B and 16C.

Referring now to FIG. 8B, assume that the controlling participant 16A activates the New Conference button 60, and a second defined area 70 is depicted in the user interface 28. The controlling participant 16A moves (for example, via an input device) the second defined area 70 such that it overlaps a portion of the first defined area 68 and encompasses only the participant identifiers 58D-58F. In response, the communication device 14A may send a control signal to the media server 12 initiating a second conference with participants 16A and 16D-16F. The communication device 14A also determines first aural position identifiers for each of the participants 16D-16F, as described above, based on the position of the corresponding participant identifiers 58D-58F with respect to the reference position indicated by the participant identifier $58A_2$. The communication device 14A also determines at least one second aural position identifier based on the first defined area 68. The communication device 14A communicates the first and second aural position identifiers to the media server 12, along with an indication that the second conference is the selected conference. In response, the 3DSAE 46 generates audio signals associated with the participants 16D-16F at the aural positions identified by the corresponding first aural position identifiers, and any audio signals originating in the first conference by either the participant 16B or the participant 16C at the aural position identified by the second aural position identifier.

Alternately, the communication device 14A may determine a second aural position identifier for the participant 16B and the participant 16C based on the position of the corresponding participant identifiers 58B and 58C with respect to the reference position indicated by the participant identifier $58A_2$. The conference processor 42 provides the audio signal of the controlling participant 16A to the participants 16D-16F, but not to the participants 16B and 16C. The controlling participant 16A may again select the first defined area 68 to be the selected conference, at which point each of the participants 16B-16F would be provided the audio signal of the controlling participant 16A.

While for purposes of illustration only two concurrent conferences have been discussed herein, the invention is not limited to two concurrent conferences, and has applicability to any number of concurrent conferences. Further, while the embodiments have been discussed in the context of the controlling participant 16A being the controlling participant, each of the participants 16 may have an analogous capability on their respective communication devices 14, and each may be able to control audio signals in multiple concurrent conference calls.

Various aspects of the present embodiments may be embodied in instructions that are stored in hardware, and may reside, for example, in RAM, flash memory, read only memory (ROM), erasable programmable ROM (EPROM), electrically erasable programmable ROM (EEPROM), registers, a hard disk, a removable disk, a CD-ROM, or any other form of computer-readable or computer-usable storage medium known in the art. All or a portion of the embodiments may be implemented as a computer program product, such as the computer-usable or computer-readable storage medium having a computer-readable program code embodied therein. The computer-readable program code can include software instructions for implementing the functionality of the embodiments described herein. An exemplary storage medium may be coupled to the processor such that the processor can read information from, and write information to, the storage medium. In the alternative, the storage medium may be integral to the processor. The processor and the storage medium may reside in an ASIC. The ASIC may reside in a media server 12, or a communication device 14, for example.

Those skilled in the art will recognize improvements and modifications to the embodiments disclosed herein. All such improvements and modifications are considered within the scope of the concepts disclosed herein and the claims that follow.

What is claimed is:

1. A computer-implemented method for controlling audio signals associated with a plurality of conferences, comprising:
   displaying, by a processing device, a user interface that depicts a first defined area and a second defined area, wherein the first defined area is associated with a first conference and the second defined area is associated with a second conference;
   displaying a first plurality of participant identifiers in association with the first defined area, wherein each of the first plurality of participant identifiers corresponds to a different participant of a plurality of participants in the first conference;
   determining a plurality of first aural position identifiers based on a position of a corresponding participant identifier with respect to a reference position, wherein each first aural position identifier corresponds to a different one of the first plurality of participant identifiers, and wherein each first aural position identifier is different from the others;
   determining at least one second aural position identifier associated with the second defined area, wherein the at least one second aural position identifier is different from each of the plurality of first aural position identifiers; and
   providing, concurrently to an audio output port, an audio signal of at least one of the plurality of participants in the first conference at an aural position based on the first aural position identifier corresponding to the at least one of the plurality of participants in the first conference, and an audio signal of at least one participant in the second conference at an aural position based on the at least one second aural position identifier.

2. The method of claim 1, further comprising:
   determining that the first conference is a selected conference;
   receiving an audio signal associated with a user of the user interface; and
   in response to the first conference being the selected conference, directing the audio signal of the user to the first conference and inhibiting the audio signal of the user from being sent to the second conference.

3. The method of claim 2, further comprising:
   receiving, via user input, a selection indicating that the second conference is the selected conference;
   receiving the audio signal associated with the user of the user interface; and
   in response to the second conference being the selected conference, directing the audio signal of the user to the second conference and inhibiting the audio signal of the user from being sent to the first conference.

4. The method of claim 1, wherein the second defined area at least in part overlaps the first defined area to form an overlapped area, and wherein a second plurality of participants corresponding to a second plurality of participant identifiers in the overlapped area is participants in both the first conference and the second conference.

5. The method of claim 1, wherein providing concurrently to the audio output port the audio signal of the at least one of the plurality of participants in the first conference at the aural position based on the first aural position identifier corresponding to the at least one of the plurality of participants, and the audio signal of the at least one participant in the second conference at the aural position based on the at least one second aural position identifier, further comprises:
   providing concurrently to the audio output port the audio signals of the plurality of participants in the first conference at aural positions based on corresponding first aural position identifiers, and the audio signals of at least two participants in the second conference at a same aural position based on the at least one second aural position identifier.

6. The method of claim 1, wherein the at least one second aural position identifier is based on a position of a participant identifier corresponding to the at least one of the plurality of participants with respect to the reference position, and wherein providing concurrently to the audio output port the audio signals of the plurality of participants in the first conference at aural positions based on corresponding first aural position identifiers, and the audio signal of the at least one participant in the second conference at an aural position based on the at least one second aural position identifier, further comprises:
   providing concurrently to the audio output port the audio signals of the plurality of participants in the first conference at aural positions based on corresponding first aural position identifiers, and the audio signal of the at least one participant in the second conference at a first aural position based on the at least one second aural position identifier, and the audio signal of a second participant of the second conference at an aural position based on a position of a participant identifier corresponding to the second participant and the reference position.

7. The method of claim 1, further comprising:
   receiving, via user input, data indicating that a user has moved the second defined area from a first position to a second position, wherein the second position is farther from the reference position than the first position; and in response thereto, decreasing a volume associated with the audio signal of the at least one participant in the second conference.

8. The method of claim 1, wherein the first defined area comprises an image of a first light beam, and the second defined area comprises an image of a second light beam.

9. A computer program product, comprising a non-transitory computer-readable medium having a computer-readable program code embodied therein, the computer-readable program code adapted to be executed on a processor to implement a method for controlling audio signals associated with a plurality of conferences, the method comprising:
displaying, by a processing device, a user interface that depicts a first defined area and a second defined area, wherein the first defined area is associated with a first conference and the second defined area is associated with a second conference;
displaying a plurality of participant identifiers in the first defined area, wherein each of the plurality of participant identifiers corresponds to a different participant of a plurality of participants in the first conference;
determining a first plurality of first aural position identifiers based on a position of a corresponding participant identifier with respect to a reference position, wherein each first aural position identifier corresponds to a different one of the first plurality of participant identifiers, and wherein each first aural position identifier is different from the others;
determining at least one second aural position identifier associated with the second defined area wherein the at least one second aural position identifier is different from each of the plurality of first aural position identifiers; and
providing, concurrently to an audio output port, an audio signal of at least one of the plurality of participants in the first conference at an aural position based on the first aural position identifier corresponding to the at least one of the plurality of participants in the first conference, and an audio signal of at least one participant in the second conference at an aural position based on the at least one second aural position identifier.

10. The computer program product of claim 9, wherein the method further comprises:
determining that the first conference is a selected conference;
receiving an audio signal associated with a user of the user interface; and
in response to the first conference being the selected conference, directing the audio signal of the user to the first conference and inhibiting the audio signal of the user from being sent to the second conference.

11. The computer program product of claim 10, wherein the method further comprises:
receiving, via user input, a selection indicating that the second conference is the selected conference;
receiving the audio signal associated with the user of the user interface; and
in response to the second conference being the selected conference, directing the audio signal of the user to the second conference and inhibiting the audio signal of the user from being sent to the first conference.

12. The computer program product of claim 9, wherein the second defined area at least in part overlaps the first defined area to form an overlapped area, and wherein a second plurality of participants corresponding to a second plurality of participant identifiers in the overlapped area is participants in both the first conference and the second conference.

13. The computer program product of claim 9, wherein the method further comprises:
receiving, via user input, data indicating that a user has moved the second defined area from a first position to a second position, wherein the second position is farther from the reference position than the first position; and
in response thereto, decreasing a volume associated with the audio signal of the at least one participant in the second conference.

14. A processing device, comprising:
a communications interface adapted to communicate with a network;
a display; and
a controller comprising a processor coupled to the communications interface, the controller adapted to:
display a user interface on the display that depicts a first defined area and a second defined area, wherein the first defined area is associated with a first conference and the second defined area is associated with a second conference;
display a first plurality of participant identifiers in the first defined area, wherein each of the first plurality of participant identifiers corresponds to a different participant of a plurality of participants in the first conference;
determine a plurality of first aural position identifiers based on a position of a corresponding participant identifier with respect to a reference position, wherein each first aural position identifier corresponds to a different one of the first plurality of participant identifiers, and wherein each first aural position identifier is different from the others;
determine at least one second aural position identifier associated with the second defined area wherein the at least one second aural position identifier is different from each of the plurality of first aural position identifiers; and
provide, concurrently to an audio output port, an audio signal of at least one of the plurality of participants in the first conference at an aural position based on the first aural position identifier corresponding to the at least one of the plurality of participants in the first conference, and an audio signal of at least one participant in the second conference at an aural position based on the at least one second aural position identifier.

15. The processing device of claim 14, wherein the controller is further adapted to:
determine that the first conference is a selected conference;
receive an audio signal associated with a user of the user interface; and
in response to the first conference being the selected conference, direct the audio signal of the user to the first conference and inhibit the audio signal of the user from being sent to the second conference.

16. The processing device of claim 15, wherein the controller is further adapted to:
receive, via user input, a selection indicating that the second conference is the selected conference;
receive the audio signal associated with the user of the user interface; and
in response to the second conference being the selected conference, direct the audio signal of the user to the second conference and inhibit the audio signal of the user from being sent to the first conference.

17. The processing device of claim 14, wherein the second defined area at least in part overlaps the first defined area to form an overlapped area, and wherein a second plurality of participants corresponding to a second plurality of participant identifiers in the overlapped area is participants in both the first conference and the second conference.

18. The processing device of claim 14, wherein the controller is further adapted to:
 receive, via user input, data indicating that a user has moved the second defined area from a first position to a second position, wherein the second position is farther from the reference position than the first position; and
 in response thereto, provide a control signal to a media server to diminish a volume associated with the audio signal of the at least one participant in the second conference.

19. The processing device of claim 14, wherein the controller is further adapted to:
 display, in response to a selection of one of the first plurality of participant identifiers, a volume selection tool;
 receive, via user input, data indicating that a user has manipulated the volume selection tool; and
 in response thereto, provide a control signal to a media server to diminish a volume of the audio signal of the participant who corresponds to the one of the first plurality of participant identifiers.

* * * * *